(12) United States Patent
Jenkins et al.

(10) Patent No.: US 8,361,398 B2
(45) Date of Patent: Jan. 29, 2013

(54) CATALYTIC CONVERTER AND METHOD FOR MAKING THE SAME

(75) Inventors: Martin Jenkins, Roswell, GA (US);
Willy Marrecau, Rome, GA (US)

(73) Assignee: NV Bekaert SA, Zwevegem (BE)

( * ) Notice: Subject to any disclaimer, the term of this patent is extended or adjusted under 35 U.S.C. 154(b) by 1431 days.

(21) Appl. No.: 10/573,443

(22) PCT Filed: Sep. 26, 2003

(86) PCT No.: PCT/EP03/50662
§ 371 (c)(1),
(2), (4) Date: Dec. 26, 2007

(87) PCT Pub. No.: WO2005/030373
PCT Pub. Date: Apr. 7, 2005

(65) Prior Publication Data
US 2008/0118409 A1     May 22, 2008

(51) Int. Cl.
*B01D 50/00* (2006.01)

(52) U.S. Cl. ........................................ 422/177

(58) Field of Classification Search .................. 422/177, 422/180; 55/487
See application file for complete search history.

(56) References Cited

U.S. PATENT DOCUMENTS

| | | |
|---|---|---|
| 4,360,957 A | 11/1982 | Eng |
| 2002/0131914 A1 | 9/2002 | Sung |
| 2003/0021745 A1 | 1/2003 | Chen |
| 2004/0194440 A1 * | 10/2004 | Bruck et al. .................... 55/487 |

FOREIGN PATENT DOCUMENTS

| | | |
|---|---|---|
| EP | 0 319 959 A2 | 6/1989 |
| EP | 1 270 886 A1 | 1/2003 |

* cited by examiner

*Primary Examiner* — Tom Duong
(74) *Attorney, Agent, or Firm* — Foley & Lardner LLP

(57) ABSTRACT

A catalytic converter as subject of the invention comprises fibers, which fibers have a fiber surface. The converter further comprises catalytic material, substantially all of this catalytic material is present on the fiber surface. The fibers are present in the catalytic converter as discrete fibers. A method for making the catalytic converter comprises providing a bundle of discrete fibers, coating them with catalytic material and inserting the coated bundle into a can.

12 Claims, 2 Drawing Sheets

CATALYTIC CONVERTER AND METHOD FOR MAKING THE SAME

FIELD OF THE INVENTION

The present invention relates to catalytic converters, e.g. catalytic converters for converting exhaust gasses of internal combustion devices such as e.g. diesel engines or fuel combustion devices, and to a method to provide such catalytic converter.

BACKGROUND OF THE INVENTION

Fibers used as a carrier of catalytic material, present in catalytic converters are well known in the art.

Fibers, usually ceramic fibers, but also metal fibers, are transformed into a fiber volume, in which fibers are mechanically bonded to each other. Such fiber volumes are then coated with the catalytic material or materials necessary to provide the catalytic conversion for which the catalytic converter is to be used.

Usually, the fibers are first bonded to each other, using sintering or using a bonding agent, and the obtained fiber volume is immersed into a solution of catalytic material. Possibly, the bonded fibers are already present in the canning of the catalytic converter.

As an example, U.S. Pat. No. 4,360,957 describes an exhaust gas treating unit, which comprises fibers having a mechanical bond to each other due to the use of a bonding agent which already comprises the catalytic material.

As a general disadvantage, the fiber volume may not be coated equally over the whole depth of the filter volume. Also the canning inner surface may be coated with catalytic material, which may have only a limited or no catalytic working when the converter will be used. Further, during use, the mechanically bonded fiber volume will be subjected to relatively severe thermal tension. Most catalytic reactions are exothermic and generate heat. Due to this temperature increase, the fiber volume will tend to expand, which in its turn may cause locally breakage of the mechanical bonds between fibers, resulting in so called cracks in the mechanical fiber structure These creates preferential paths via which the reactants, such as gasses or liquids, will flow. The latter may cause the catalytic reaction to take place incomplete or even not to take place at all, due to insufficient retention time, being the time a reactant needs to pass through the catalytic converter. Possibly, if the temperature becomes too high, the fiber volume may melt down.

As the fiber volume with preset boundaries is made prior to installing in the canning of the converter, small tolerances between fiber volume and canning are required. These small tolerances are also needed to avoid preferential reactant flows near the canning, causing decreasing retention time of the reactants at the surfaces of the fibers where the catalyst material is present.

As an other drawback, the shapes of the canning are restricted, as the canning must have an opening, via which the fiber volume as a whole must enter the inner volume of the canning.

SUMMARY OF THE INVENTION

It is a object of the present invention to provide a catalytic converter, which overcomes the drawbacks of the prior art. It is further an object of the present invention to provide a catalytic converter having catalytic material equally distributed over the whole volume of the converter. It is also an object of the present invention to reduce the loss of catalytic material covering the inner surface of the converters canning. It is also an object of the invention to avoid the risk on cracking the sintered material caused by thermal expansion. It is further an object of the present invention to facilitate the design of the canning of converters.

A catalytic converter as subject of the invention, comprises fibers having a fiber surface. The catalytic converter comprises further catalytic material, substantially all of the catalytic material is present, e.g. as a coating, on the fiber surface. A catalytic converter as subject of the invention is characterized in that the fibers are present in said catalytic converter as discrete fibers.

It is a further subject of the present invention to provide a method for making a catalytic converter as subject of the invention. A method to provide a catalytic converter as subject of the invention comprises the steps of
  Providing at least one bundle of discrete fibers;
  Coating at least one of the bundle of discrete fibers with catalytic material, providing a bundle of coated discrete fibers;
  Providing a canning having an inner volume;
  Providing all the bundle of discrete fibers as discrete fibers in said volume.

A catalytic converter as subject of the invention has several advantages over the prior art. As the fibers are present as discrete fibers, they are not mechanically or chemically bound or connected one to the other. As a result, vibration imposed to the converter, or thermal expansion due to thermal energy of the chemical, catalytic reaction will not cause mechanical break down of the converter. Also when the converter is in use, the thermal expansion of the fibers will result in minor movements of one fiber to the adjacent fibers, due to the thermal expansion of each fiber individually. The contacts between adjacent fibers, which are merely two fiber surfaces laying one against the other, may allow such movements to a large extend as compared to fibers out of converters of prior art, where adjacent fibers were mechanically locked one to the other.

The term "discrete fibers" do not necessarily prevent the individual fibers from making physical contact with each other. But discrete means that there is no mechanical anchoring or mechanical bond from fibers one to the other.

Advantageously, at least m bundles of discrete fibers may be provided for which m is larger or equal to two. The catalytic material may consist of n different catalytic compounds and m is larger or equal to n.

According to a preferred method as subject of the invention, each of the m bundles of discrete fibers is coated with at maximum one of the n catalytic compounds. Possibly at least one of the m bundles of discrete fibers may not be coated.

All bundles, both coated and uncoated, may then be provided in the inner volume of the canning of the converter as discrete fibers.

This results in a catalytic converter, wherein the fibers consisting in m groups of fibers, for which m is lager or equal to two and the catalytic material consisting in n different catalytic compounds, for which m is larger or equal to m. Each of said m groups of fibers has at maximum one of said n catalytic compounds present on their fiber surface. Possibly there are at least one group of discrete fibers which are not coated with catalytic material.

The advantage of having the different catalytic compounds on different fibers, is that the mixture and the content of each catalytic compound can easily be adjusted. Also mixtures can be obtained, which would otherwise be difficult or even impossible to obtain due to the presence of one catalytic compound, prior to the application of the other compounds on the fiber surface. As one can provide several compounds in the same catalytic converter, several catalytic reactions may be obtained in the same converter.

If necessary, the step of coating a bundle of discrete fibers may be preceded by a preliminary step, for forming an intermediate layer on the outer surface of the fibers. As an example, a wash coat layer of a high surface area gamma alumina, titanium oxide or other washcoat layer may be provided at the outer surface of the fibers, which are then preferably metal fibers.

The catalytic material may comprise one or more catalytic compounds. Each compound is chemical element or a mixture of different chemical elements, which together perform and realize a chemical catalytic reaction during use of the converter.

As an example, such catalytic compound may comprise Cu, Ni, Pt, Pd, Ag, Au, Rh, V, W, Fe, Mo and/or Ir.

According to the method for providing a catalytic converter as subject of the invention, the bundles of discrete fibers are applied in the canning of the converter as individual, loose, discrete fibers. The bundles may be broken to provide fibers with a specific staple length, or may be provided into the canning as bundles of fibers of endless length, also called "filaments". The fibers in the converter may be randomized in direction, or they may be given a preferential direction, e.g. perpendicular or parallel to the flow direction of reactants which will pass through the converter during use.

Possibly over the whole inner volume of the converter's canning, the fibers may be distributed evenly, this means that for each given volume inside the inner volume of the canning the same weight of fibers per volume is present.

Alternatively, the weight per volume of fibers present in the inner volume of the canning may vary, by unequally distributing the fibers in the inner volume of the canning.

This has as a result that the porosity of the catalytic converter may either be uniform over the inner volume of the canning, in case the fibers are equally distributed in the inner volume of the canning, or may vary over the inner volume of the canning, in case the fibers are unequally distributed in the inner volume of the canning.

Possibly, in case more than one catalytic compound is used to provide the catalytic material of the converter, the different compounds are evenly distributed over the inner volume of the converters canning. Alternatively, each catalytic compound may only be present at one discrete part of the inner volume of the canning.

By having the different catalytic compounds separately in discrete parts of the inner volume of the catalytic converters canning, one may induce different catalytic reactions in the same converter, meanwhile avoiding negative interference of one reaction on an other.

Possibly each discrete part of the inner volume of the canning, comprising only one group of discrete fibers, may have a different, distinct porosity, adjusted for the catalytic reaction which is to be achieved in this part of the inner volume of the canning.

Preferably, the fibers used to provide a catalytic converter as subject of the invention are metal fibers, most preferred stainless steel fibers out of Fe-Ni-Cr or Fe-AL-Cr alloy. The metal fibers are characterized by an equivalent diameter, which is the diameter of an imaginary circle, having the same surface as the radial cross section of the fiber in case. Preferably, the metal fibers have an equivalent diameter being less than 100 µm, e.g. less than 70 µm or even less than 65 µm such as less than 40 µm.

The bundles of discrete fibers may be obtained using known techniques. In case of metal fibers, the bundles may be steel wool bundles, or bundles obtained by bundle drawing techniques, coil shaving techniques such as described in EP319959A2, melt extraction techniques or any other known technique.

The fibers used to provide a catalytic converter are preferably metal fibers, but a part of the fibers may be other temperature resistant fibers, such as glass fibers, ceramic fibers, basalt fibers, SiC, WC-or C-fibers.

A catalytic converter as subject of the invention may comprise additional elements, next to the canning including fibers and catalytic material. The converter may as an example comprise a heating device for heating the fibers or reactants provided to the converter, or additional fuel injection devices for providing additional fuel or any other reactant to the converter.

The catalytic converters as subject of the invention may be used for conversion of exhaust gasses of combustion devices, such as e.g. fuel or gas combustion units, gasoline engines, diesel combustion devices, other engines or burners.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1:
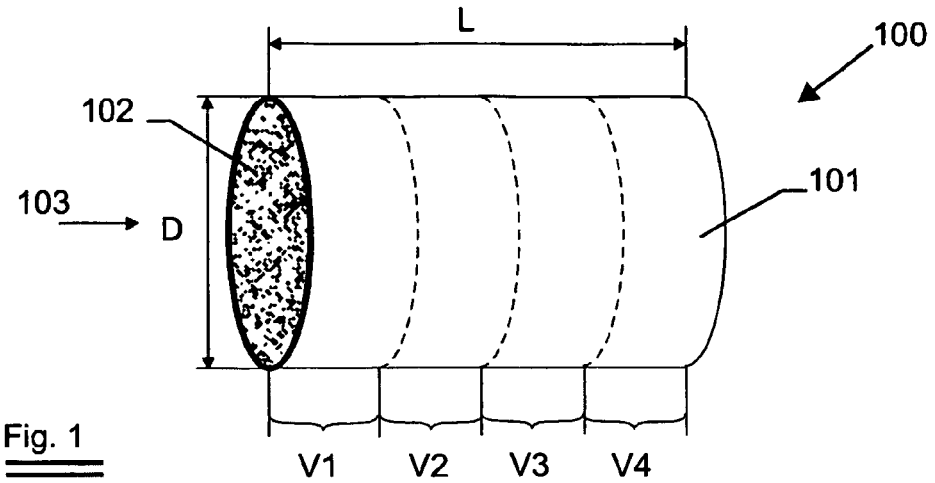
FIG. 1 shows schematically a catalytic converter as subject of the invention.

A catalytic converter 100 as subject of the invention s schematically shown in FIG. 1.

The canning 101 has an inner volume of approximately 50.24 cubic inches. The cylindrical volume has a diameter D of 4 inches and a length L of 4 inches. The volume of the canning is divided into 4 consecutive zones V1, V2, V3 and V4, each zone having a length equal to ¼ of the total length L of the canning.

In each zone is provided with 50 grams of metal fibers 102 present as discrete fibers. The fibers are provide out of a Fe-Cr-Al alloy, such as e.g. Fecralloy® or Aluchrome®. the fibers are obtained by coil shaving a metal foil as described in EP319959. They have an equivalent diameter of approximately 65 µm, and have a substantially rectangular cross section. Prior to put the fibers in the canning, the fiber bundle obtained by shaving, was coated with a catalytic material Pt. As an alternative, Pd was applied as catalytic material. The coating represents approximately 4% weight of the fiber material.

After being coated, 50 gram of bundles of coated discrete fibers were provided as discrete filaments in each zone V1, V2, V3 and V4 of the catalytic converter. As a result, the converter comprises 200 grams of discrete metal fibers, comprising 4% weight of catalytic material, which is only present at the surfaces of the fibers. In each zone, an equally distributed porosity of 97% was obtained.

As an alternative, some of the bundles were coated with CeO, which as an example improves the oxidizing reaction in case the converter was used as diesel soot particulate trap, oxidizing the soot present into $CO_2$, in an exhaust gas stream passing through the converter in flow direction as indicated 103.

In this embodiment, the metal fibers consisted of two groups of fibers, and two catalytic compounds were present in the converter. One group of fibers was coated with one catalytic compound, e.g. Pt or Pd, and the other group of fibers comprised the second catalytic compound, e.g. CeO.

As an alternative, less catalytic material was provided to the fibers present in the downstream zone of the converter. As an other alternative, the porosity in the downstream zones of the converter was reduced to 90% or even less.

As a further alternative, other non coated fibers were blend with the coated metal fibers in order to reduce the amount of catalyst in e.g. the downstream zones of the converter. In such a way, the number of different coated fibers (coated with a different amount of catalytic compound) can be reduced, and so economizing the production process of the converter.

As an example, the converter comprising Pt is preferably used as diesel soot particulate trap, oxidizing the soot present into $CO_2$, in an exhaust gas stream passing through the converter. An identical converter but comprising Pd in stead of Pt, was used to oxidize NO to $NO_2$ in an identical exhaust gas stream passing through the converter.

Figure 2:
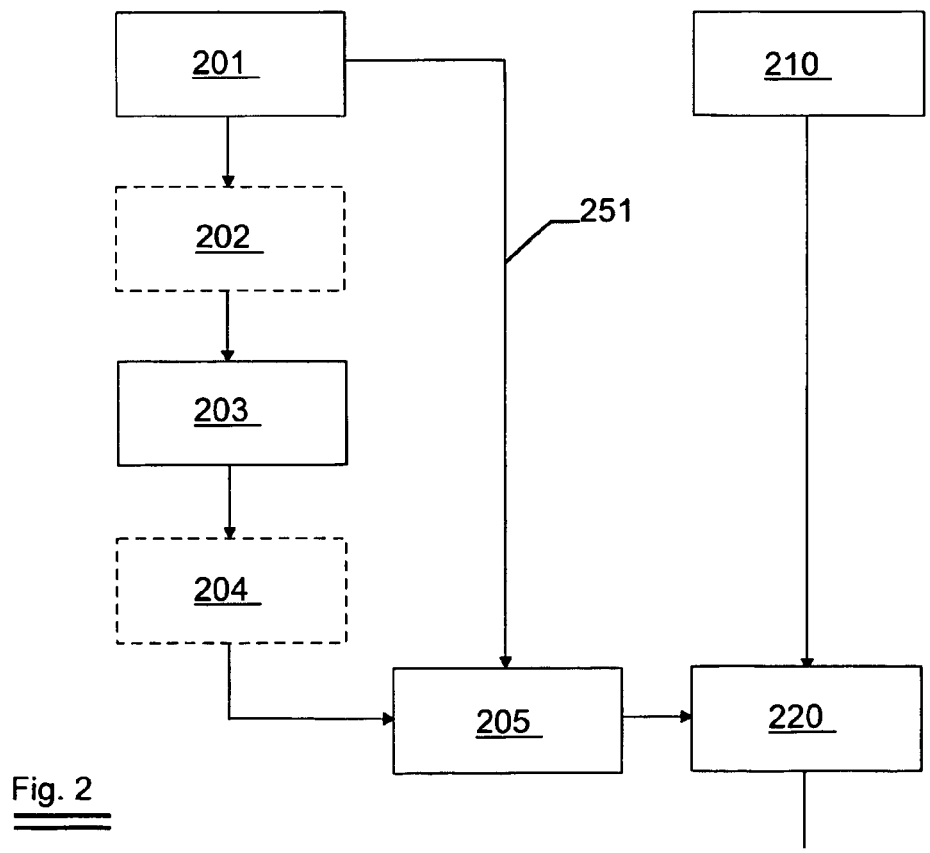
FIG. 2 shows schematically the steps to provide a catalytic converter as subject of the invention.

A schematically view on the production process of the catalytic converter as subject of the invention is shown in FIG. 2.

In a first step 201, one or more different bundles of discrete fibers are provided.

Some or all of the bundles are given a coating with a catalytic compound in step 203. this may be done by chemical vapor deposition, wet or dry coating, or any other fiber coating process as presently known.

Possibly, prior to the coating step 203, a pre treating process step 202 is executed. Also, a post treatment step 204 can be executed. Such pre-or post treating step may be a heat treatment, a rinsing of the fibers, or any necessary step to enable the coating step to provide a coating to the fiber surface in an optimal way.

In step 205, the bundle of coated discrete fibers may be blended with uncoated discrete fibers, provide by the step 201 as indicated with arrow 251.

Possibly the fibers may be supplied as filaments, which are broken down to staple fibers in step 205. alternatively, the filament fibers are further used as discrete filament fibers. In an other step 210, a canning is provided having an inner volume.

In step 220, the bundles of discrete fibers, coated or not, are provided in the volume of the canning, providing a catalytic converter as subject of the invention.

Figure 3:
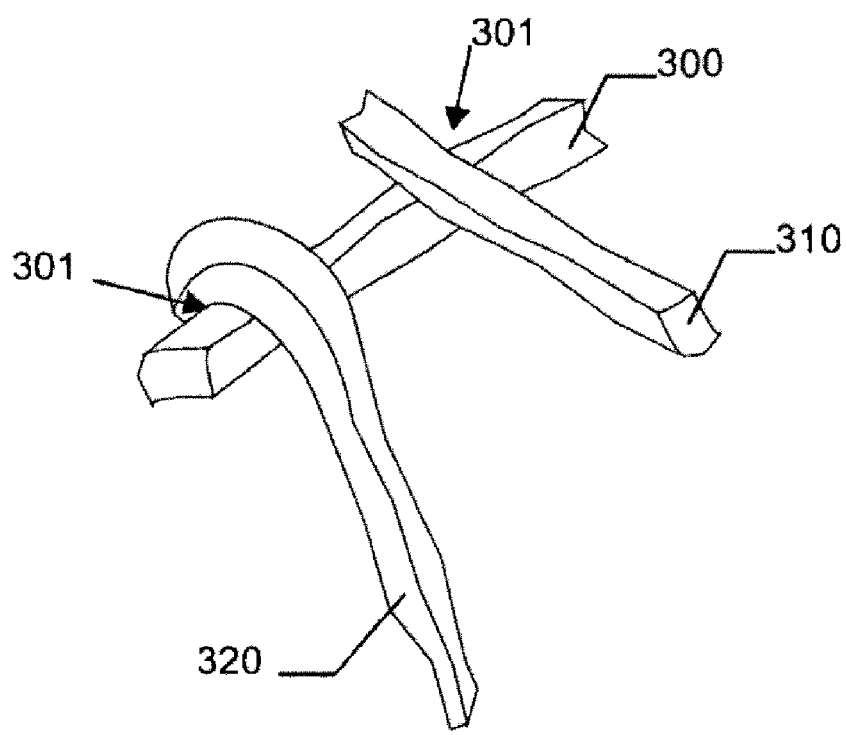
FIG. 3 shows schematically fibers as they may be present in a catalytic converter as subject of the invention.

FIG. 3 shows schematically some fibers 300, 310 and 320 present in the catalytic converter. As is to be understood by fibers being present in said catalytic converter as discrete fibers, the fibers make physical contact with each other at the locations indicated 301. but at these locations 301, the fibers are not firmly connected to each other as if would be the case when, e.g. metal fibers would be sintered. The fibers 300, 310 and 320 are not anchored or mechanically bonded to each other at locations 301.

The invention claimed is:

1. A catalytic converter, said converter comprising metal fibers, said metal fibers having a fiber surface, said converter comprising catalytic material, substantially all of said catalytic material being present on said fiber surface, wherein said metal fibers are present in said catalytic converter as one or more bundles of metal fibers, and wherein there is no mechanical anchoring or mechanical bond from one metal fiber to an other metal fiber.

2. A catalytic converter as claimed in claim 1, wherein said metal fibers comprise m groups of metal fibers, for which m being equal to or larger than two, said catalytic material comprises n different catalytic compounds, for which m being equal to or larger than n, wherein each of said m groups of metal fibers have at maximum one of said n catalytic compounds present on their fiber surface.

3. A catalytic converter as claimed in claim 2, wherein at least one of said m groups of metal fibers has no catalytic compound present on their fiber surface.

4. A catalytic converter as claimed in claim 2, said catalytic converter comprising a canning having an inner volume, each of said m groups of metal fibers being present in only one discrete part of said volume.

5. A catalytic converter as claimed in claim 1, said catalytic converter comprising a canning having an inner volume, said metal fibers filling said inner volume, said metal fibers being unequally distributed over said volume.

6. A catalytic converter as claimed in claim 1, said catalytic converter comprising a canning having an inner volume, said metal fibers filling said inner volume, said metal fibers being equally distributed over said volume.

7. A method to provide a catalytic converter as claimed in claim 1, comprising the steps of
providing at least one bundle of discrete fibers;
coating said at least one bundle of discrete fibers with catalytic material, so as to provide a bundle of coated discrete fibers;
providing a canning having an inner volume;
providing all said at least one bundle of discrete fibers in said volume.

8. A method to provide a catalytic converter as claimed in claim 7, wherein at least m bundles of discrete fibers being provided, m being equal to or larger than two, said catalytic material consisting of n different catalytic compounds, m being equal to or larger than n, wherein each of said m bundles of discrete fibers is coated with at maximum one of said n catalytic compounds.

9. A method to provide a catalytic converter as claimed in claim 8, wherein at least one of said m bundles of discrete fibers is not coated.

10. A method to provide a catalytic converter as claimed in claim 7, wherein said bundle of discrete fibers is provided equally distributed in said volume.

11. A method to provide a catalytic converter as claimed in claim 7, wherein said bundle of discrete fibers is provided unequally distributed in said volume.

12. A method to provide a catalytic converter as claimed in claim 8, wherein each of said m bundles of discrete fibers is provided in only one discrete part of said volume.

* * * * *